United States Patent
Su et al.

(10) Patent No.: US 11,455,516 B2
(45) Date of Patent: Sep. 27, 2022

(54) IMAGE LIGHTING METHODS AND APPARATUSES, ELECTRONIC DEVICES, AND STORAGE MEDIA

(71) Applicant: SHENZHEN SENSETIME TECHNOLOGY CO., LTD., Shenzhen (CN)

(72) Inventors: Jinhai Su, Shenzhen (CN); Songfang Han, Shenzhen (CN); Qiong Yan, Shenzhen (CN); Haoran Wang, Shenzhen (CN)

(73) Assignee: SHENZHEN SENSETIME TECHNOLOGY CO., LTD., Shenzhen (CN)

( * ) Notice: Subject to any disclaimer, the term of this patent is extended or adjusted under 35 U.S.C. 154(b) by 488 days.

(21) Appl. No.: 16/727,231

(22) Filed: Dec. 26, 2019

(65) Prior Publication Data

US 2020/0143230 A1 May 7, 2020

Related U.S. Application Data

(63) Continuation of application No. PCT/CN2018/118531, filed on Nov. 30, 2018.

(30) Foreign Application Priority Data

Jul. 27, 2018 (CN) .......................... 201810848283.3

(51) Int. Cl.
 *G06N 3/04* (2006.01)
 *G06T 5/00* (2006.01)
 (Continued)

(52) U.S. Cl.
 CPC .......... *G06N 3/0454* (2013.01); *G06T 5/008* (2013.01); *G06T 5/009* (2013.01); *G06T 15/506* (2013.01);
 (Continued)

(58) Field of Classification Search
 CPC ............................ G06N 3/0454; G06T 5/008
 See application file for complete search history.

(56) References Cited

U.S. PATENT DOCUMENTS

| 8,120,654 B2 | 2/2012 | Okamura |
| 2017/0132769 A1* | 5/2017 | Barron .................... G06T 5/003 |
| 2020/0068151 A1* | 2/2020 | Pourreza Shahri .. H04N 5/2356 |

FOREIGN PATENT DOCUMENTS

| CN | 103606134 A | 2/2014 |
| CN | 106875344 A | 6/2017 |

(Continued)

OTHER PUBLICATIONS

N. Capece, F. Banterle, P. Cignoni, F. Ganovelli and U. Erra, "Turning a Smartphone Selfie Into a Studio Portrait," in IEEE Computer Graphics and Applications, vol. 40, No. 1, pp. 140-147, Jan. 1-Feb. 2020, doi: 10.1109/MCG.2019.2958274. (Year: 2020).*

(Continued)

*Primary Examiner* — Shivang I Patel
(74) *Attorney, Agent, or Firm* — Syncoda LLC; Feng Ma

(57) ABSTRACT

An image lighting method includes: determining a convolutional neural network corresponding to a lighting operation type of an initial image; obtaining local feature information and global feature information of initial image according to convolutional neural network; obtaining fusion feature information of initial image according to convolutional neural network based on local feature information and global feature information; obtaining a maximum pooling result map and a minimum pooling result map according to convolutional neural network based on a luminance component map of initial image; obtaining a bilateral grid matrix of initial image based on fusion feature information, maximum pooling result map, and minimum pooling result map; and performing affine transformation on initial image according to bilateral grid matrix to obtain a target image, (Continued)

the target image being an image obtained after lighting initial image according to lighting operation type.

20 Claims, 11 Drawing Sheets

(51) Int. Cl.
  *G06T 15/50* (2011.01)
  *G06V 40/16* (2022.01)
(52) U.S. Cl.
  CPC .. *G06V 40/168* (2022.01); *G06T 2207/20084* (2013.01); *G06T 2207/20221* (2013.01)

(56) References Cited

FOREIGN PATENT DOCUMENTS

| | | |
|---|---|---|
| CN | 108181952 A | 6/2018 |
| CN | 108305236 A | 7/2018 |
| JP | 2004242099 A | 8/2004 |
| JP | 2009151350 A | 7/2009 |
| JP | 2015075793 A | 4/2015 |
| JP | 2017147658 A | 8/2017 |
| JP | 2018005639 A | 1/2018 |
| JP | 2018506788 A | 3/2018 |
| KR | 100698845 B1 | 3/2007 |
| KR | 101863196 B1 | 6/2018 |
| TW | 201732305 A | 9/2017 |
| TW | 201807619 A | 3/2018 |
| TW | M558943 U | 4/2018 |
| WO | 2018113567 A1 | 6/2018 |

OTHER PUBLICATIONS

Notice of Allowance of the Korean application No. 10-2019-7038766, dated Jul. 22, 2021.
Written Opinion of the International Search Authority in the international application No. PCT/CN2018/118531, dated Apr. 28, 2019.
First Office Action of the Taiwanese application No. 108126231, dated Mar. 24, 2020.
Guo Jichang et al. "Single image rain removal based on multi-scale convolutional neural network", Journal of Harbin Institute of Technology, mailed on Mar. 30, 2018, the whole document.
First Office Action of the Chinese application No. 201810848283.3, dated Apr. 17, 2020.
Haruki Kawanaka, Yuji Iwahori, Robert J. Woodham, and Kenji Funahashi, "Image Rendering under Any Light Source Direction by Learning of Surface Reflectance with Neural Network", IEICE Technical Report, Japan, Institute of Electronics, Information and Communication Engineers, Sep. 20, 2006, the 106th vol. No. 264, p. 7-12.
First Office Action of the Japanese application No. 2019-570129, dated Feb. 2, 2021.
First Office Action of the Korean application No. 10-2019-7038766, dated Apr. 8, 2021.
International Search Report in the international application No. PCT/CN2018/118531, dated Apr. 28, 2019.
Gharbi, M., Chen, J., Barron, J. T., Hasinoff, S. W., & Durand, F. (Jul. 10, 2017). Deep Bilateral Learning for Real-Time Image Enhancement, http://doi.org/10.1145/3072959.3073592.
http://sepwww.stanford.edu/data/media/public/sep/morgan/texturematch/paper_html/node3.html.
He, K., & Sun, J. (May 5, 2015). Fast Guided Filter. arXiv.org.

\* cited by examiner

IMAGE LIGHTING METHODS AND APPARATUSES, ELECTRONIC DEVICES, AND STORAGE MEDIA

CROSS-REFERENCE TO RELATED APPLICATIONS

This is a U.S. continuation application of International Application No. PCT/CN2018/118531, filed on Nov. 30, 2018, which claims priority to Chinese Patent Application No. 201810848283.3, filed on Jul. 27, 2018. The disclosures of these applications are incorporated herein by reference in their entirety.

BACKGROUND

As the pixel of a camera of a mobile terminal (for example, a cellphone, a Tablet PC, a bracelet, etc.) is improved constantly, more and more users start to frequently use the terminal device to photograph a portrait and beautify the image after the portrait is photographed, so as to obtain an ideal portrait photographing effect. Ideal portrait photographing requires professional lighting distribution; applying a proper amount of illumination to the face to achieve a better photographing effect.

SUMMARY

The present disclosure relates to image processing technologies, and in particular, to image lighting methods and apparatuses, electronic devices, and storage media.

In one aspect, embodiments of the present disclosure provide an image lighting method, including:

determining a convolutional neural network corresponding to a lighting operation type of an initial image;

obtaining local feature information and global feature information of the initial image by means of the convolutional neural network;

obtaining, based on the local feature information and the global feature information, fusion feature information of the initial image by means of the convolutional neural network;

obtaining, based on a luminance component map of the initial image, a maximum pooling result map and a minimum pooling result map by means of the convolutional neural network;

obtaining, based on the fusion feature information, the maximum pooling result map, and the minimum pooling result map, a bilateral grid matrix of the initial image; and performing affine transformation on the initial image according to the bilateral grid matrix to obtain a target image, the target image being an image obtained after lighting the initial image according to the lighting operation type.

A second aspect of embodiments of the present disclosure further provides an image lighting apparatus, including:

a convolutional neural network obtaining module, configured to determine a convolutional neural network corresponding to a lighting operation type of an initial image;

a feature information obtaining module, configured to obtain local feature information and global feature information of the initial image by means of the convolutional neural network;

a fusion feature information obtaining module, configured to obtain, based on the local feature information and the global feature information, fusion feature information of the initial image by means of the convolutional neural network;

a pooling result map obtaining module, configured to obtain, based on a luminance component map of the initial image, a maximum pooling result map and a minimum pooling result map by means of the convolutional neural network;

a bilateral grid matrix obtaining module, configured to obtain, based on the fusion feature information, the maximum pooling result map, and the minimum pooling result map, a bilateral grid matrix of the initial image; and a target image obtaining module, configured to perform affine transformation on the initial image according to the bilateral grid matrix to obtain a target image, the target image being an image obtained after lighting the initial image according to the lighting operation type.

A third aspect of embodiments of the present disclosure further provides an electronic device, including:

a memory, configured to store computer-readable instructions; and a processor, configured to invoke and execute the computer-readable instructions in the memory to execute the image lighting method provided by the embodiments of the present disclosure.

A fourth aspect of the embodiments of the present disclosure further provides a non-transitory storage medium, which is configured to store computer-readable instructions, wherein execution of the instructions by the processor causes the processor to perform the image lighting method provided by the embodiments of the present disclosure.

It is to be understood that the above general descriptions and the following detailed descriptions are only exemplary and explanatory and not intended to limit the present disclosure.

DETAILED DESCRIPTION

Figure 1:
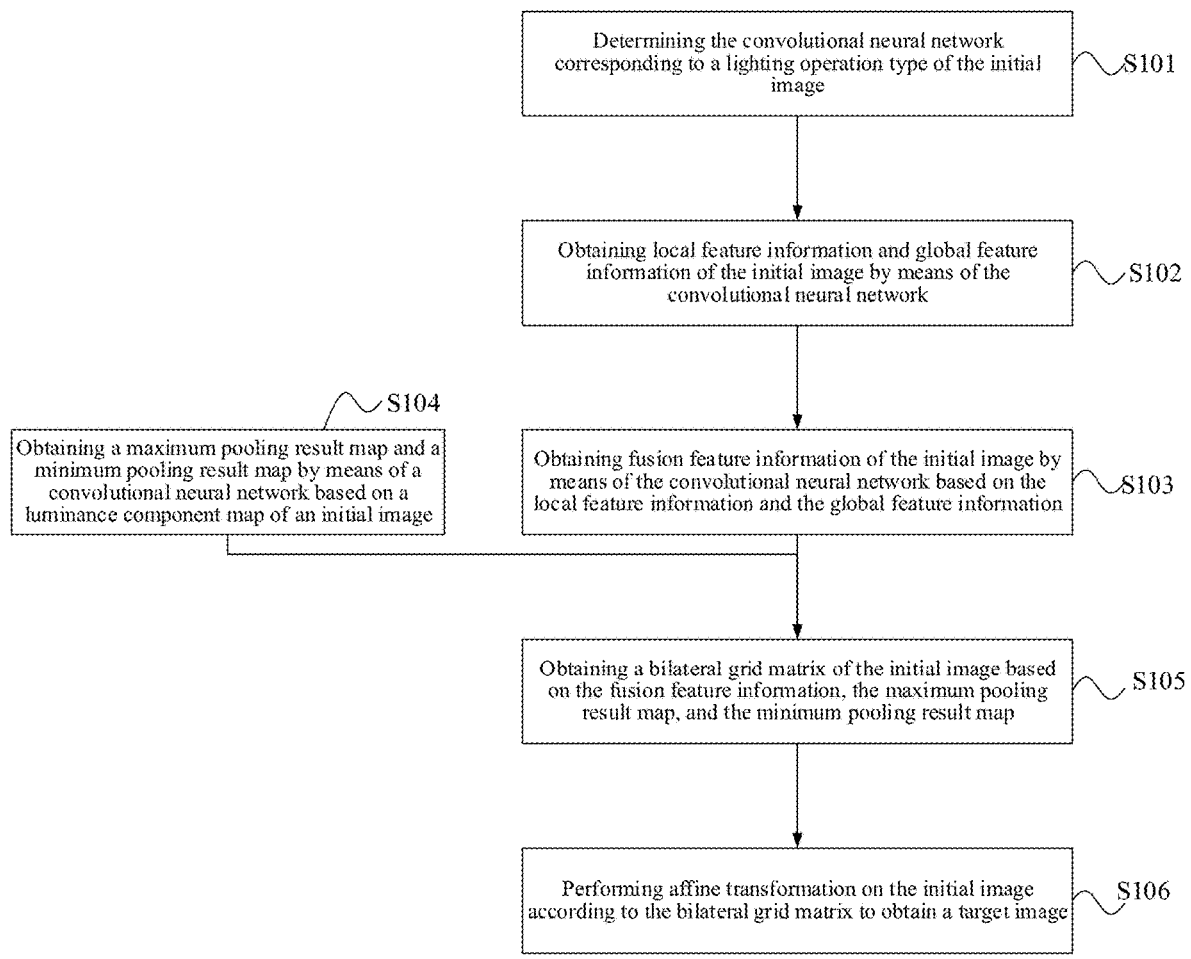
FIG. 1 is an exemplary flowchart I of an image lighting method provided by embodiments of the present disclosure.

In many actual photographing scenes, it may be difficult to obtain an ideal light distribution environment. Therefore, the portrait in the image obtained in actual photographing generally has problems such as dark face, lacking of three-dimensional feeling, and uneven face light rays.

To solve the problems above, 3D modeling can be performed on the portrait according to the portrait photo, and illumination is adjusted on the portrait; the image is rendered; and the lighted image is obtained.

The lighting mode in the related technology is widely applied to fields such as face identification, image-based rendering, and movie post production. However, the portrait modeling is greatly influenced by face identification; when face identification is inaccurate, an error for modeling is great; therefore, an image lighting solution in the related technology is complicated and has low efficiency.

The image lighting methods and apparatus, electronic devices, and storage media of the embodiments are applied; by using the deep learnt convolutional neural network technology, using the convolutional neural network to perform feature extraction on the initial image, obtaining an adaptive bilateral grid matrix of the initial image based on the maximum pooling result map and the minimum pooling result map of the initial image, and obtaining a target image of the initial image according to the bilateral grid matrix, a lighting effect of the image is more natural.

The present disclosure is further described in detail below with reference to the accompanying drawings and the embodiments. It should be understood that the specific embodiments described herein are merely used for explaining the present disclosure, rather than defining the present disclosure.

A user generally uses a camera of a portable terminal device (for example, a cellphone, a tablet PC, a bracelet, etc.) for taking a group photo and selfie. As the pixel of a camera of a portable mobile terminal is improved constantly, more and more users start to use the terminal device to photograph a portrait and beautify the image obtained from portrait photographing, so as to obtain an ideal portrait photographing effect. However, ideal portrait photographing requires professional lighting; applying a proper amount of illumination to the face to achieve a better photographing effect. However, in most actual photographing scenes, it is hard to obtain an ideal lighting environment. Therefore, the portrait in the image obtained in actual photographing generally has problems such as dark face, lacking of three-dimensional feeling, and uneven face light rays.

In related technology, generally for the portrait photo obtained after the photographing is completed, 3D modeling is performed on the portrait, illumination is adjusted on the portrait; the image is rendered; and the lighted image is obtained. However, the portrait modeling is greatly influenced by face identification; when face identification is inaccurate, an error for modeling is great. Therefore, an image lighting solution in the related technology is complicated and has low efficiency.

To solve the problems above, embodiments of the present disclosure provide image lighting methods and apparatuses, electronic devices, and storage media, and the lighting effect is good.

FIG. 1 is an exemplary flowchart of an image lighting method provided by embodiments of the present disclosure. The method can be applied to any terminal device carrying a camera, and can further be applied to a computer and a server. An execution body of the method may be a terminal device having a camera, for example, a cellphone. As shown in FIG. 1, the image lighting method includes:

S101, a convolutional neural network corresponding to a lighting operation type of an initial image is determined.

S102, local feature information and global feature information of the initial image are obtained by means of the convolutional neural network.

Exemplarily, the initial image may be an image obtained by means of photographing by a camera.

S103, fusion feature information of the initial image is obtained by means of the convolutional neural network based on the local feature information and the global feature information.

S104, a maximum pooling result map and a minimum pooling result map are obtained by means of the convolutional neural network based on a luminance component map of the initial image.

Exemplarily, S104 is executed before S105 and has no strict execution order relation with S101-S103.

S105, a bilateral grid matrix of the initial image is obtained based on the fusion feature information, the maximum pooling result map, and the minimum pooling result map.

Exemplarily, the embodiments of the present disclosure relates to inputting the initial image to a trained convolutional neural network, to obtain the bilateral grid matrix of the initial image.

Exemplarily, before executing the image lighting method provided by the embodiments of the present disclosure, the embodiments of the present disclosure further include using a label image to train the convolutional neural network, to obtain the trained convolutional neural network. The label image includes an original portrait image and a lighted portrait image. The convolutional neural network obtained by means of training by means of the label image may implement lighting for any portrait image.

Figure 2:
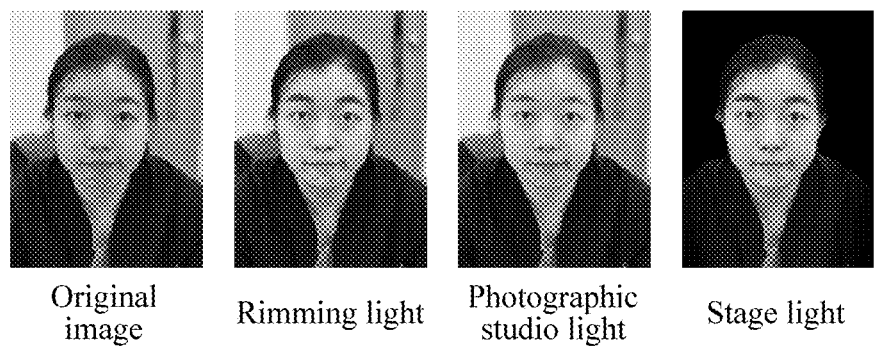
FIG. 2 is a schematic diagram of an image lighting effect provided by embodiments of the present disclosure.

In an embodiment, the lighting type for the portrait image includes rimming light, photographic studio light, stage light, monochromatic light, two-color light, or polychromatic light. FIG. 2 is a schematic diagram of an image lighting effect provided by embodiments of the present disclosure. As compared with the portrait image that is not lighted, the portrait image after the rimming light luminous effect processing, five sense organs of the face can be more stereoscopic. As compared with the portrait image that is not lighted, the portrait image after the photographic studio light luminous effect processing, light rays for the facial part are fuller and more uniform. Corresponding to different lighting types, different label images are included; different label images are used to train the convolutional neural network, to obtain the convolutional neural networks corresponding to different lighting types. When requiring to perform lighting in a dimming light type on the initial image, the convolutional neural network corresponding to the dimming light type is correspondingly adopted. When requiring to perform lighting in a dimming light type on the initial image, the convolutional neural network corresponding to the dimming light type is correspondingly adopted. In actual applications, the lighting types for the portrait image may also include other types. In an embodiment, the initial image and the face mask map of the initial image can also be input to the convolutional neural network at the same time.

Figure 3:
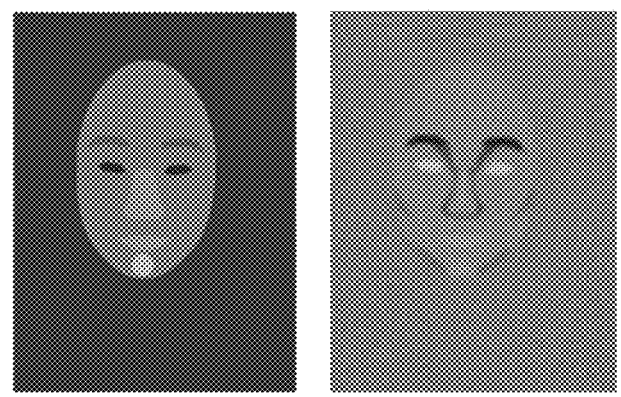
FIG. 3 is a schematic diagram of a face mask map provided by embodiments of the present disclosure.

Exemplarily, the face mask map may be obtained by performing face identification on the initial image using a face identification algorithm, and may be a face frame diagram built-in in a mobile terminal, such as a cellphone. FIG. 3 is a schematic diagram of a face mask map provided by embodiments of the present disclosure. The face mask map generally includes information such as eyebrows, eyes, nose, mouth, face outline of a face, as shown in the left side of FIG. 3. Inputting the face mask map and the initial image to the convolutional neural network at the same time may improve the lighting effect for the face.

In an embodiment, the face mask map in embodiments of the present disclosure further includes at least one of nose shadow information, nose wing information, nose tip information, cheek information, temple information, or skin color type information of a face. The face mask map including the information above may be referred to as a face detail mask map, as shown in the right side of FIG. 3. Obtaining the face mask map with more detailed information may enable a better effect for the users having different skin colors regarding the face lighting effect.

In a possible embodiment, before executing inputting the initial image to the feature extraction layer of the convolutional neural network in S102, face correction can be first performed on the luminance component map of the initial image according to the face detail mask map of the initial image, to obtain the corrected image. Then the corrected image, or the amended image and the face mask map are input to the convolutional neural network at the same time.

Exemplarily, for the convolutional neural network of any lighting type, the convolutional neural network in this embodiment includes a feature extraction layer, a fusion layer, and a pooling layer.

In actual applications, the feature extraction layer is used for convoluting the image input into the convolutional neural network to extract a low hierarchy feature and a high hierarchy feature of the image. The low hierarchy feature generally includes features such as edges, curves in the image; the high hierarchy feature generally corresponds to features such as maps and characters in the image.

Based on this embodiment, detailed explanation is made for the feature extraction layer in the convolutional neural network. Exemplarily, the feature extraction layer includes a low hierarchy feature extraction layer and a high hierarchy feature extraction layer. The high hierarchy feature extraction layer includes a local feature extraction layer and a global feature extraction layer. Accordingly, the obtaining the local feature information and the global feature information of the initial image by means of the convolutional neural network in operation S102 includes:

S11, the initial image is input to a low hierarchy feature extraction layer of the convolutional neural network, to obtain low hierarchy feature information of the initial image.

Exemplarily, the initial image is first input to the low hierarchy feature extraction layer of the convolutional neural network, to obtain the low hierarchy feature information of the initial image. Exemplarily, the low hierarchy feature extraction layer includes 8 convolutional layers; the low hierarchy feature information obtained upon the low hierarchy feature extraction layer is a feature matrix; the size of the feature matrix is 64×64, and the number of channels is coeff*gd*(2n_conv), where coeff is a preset parameter, and may exemplarily be 1; gd is a bilateral grid depth, and may exemplarily be 8; n_conv is the number of the convolutional layers, and may exemplarily be 8. Accordingly, the number of channels may exemplarily be 1*8*2⁸=512.

In an embodiment, the size of the input of the convolutional neural network, the number of the convolutional layers, and the size and depth of the bilateral grid in embodiments of the present disclosure may be freely adjusted according to the performance and effect requirements of the convolutional neural network.

Exemplarily, the size of the input of the convolutional neural network, i.e., the initial image, may be between 64×64 and 512×512; the number of the low hierarchy feature extraction convolutional layers is not less than log 2(in_hw/ g_hw), where in_hw is a side length of the input image of the convolutional neural network, for example, 512; g_hw is a side length of the bilateral grid of the initial image obtained by means of the convolutional neural network, for example, 32. Controlling the size of the input image of the convolutional neural network may adjust the size of the bilateral grid. In actual applications, the depth of the bilateral grid is generally floating between 1 and 128.

S12, the low hierarchy feature information of the initial image is input to a local feature extraction layer of the convolutional neural network, to obtain local feature information of the initial image.

S13, the low hierarchy feature information of the initial image is input to a global feature extraction layer of the convolutional neural network, to obtain global feature information of the initial image.

Exemplarily, after extracting the low hierarchy feature information of the initial image, the low hierarchy feature information of the initial image is input into the high hierarchy feature extraction layer of the convolutional neural network. In actual applications, the low hierarchy feature information of the initial image is input into the local feature extraction layer and the global feature extraction layer of the convolutional neural network at the same time, to obtain the local feature information and the global feature information of the initial image. Exemplarily, extracting the global feature of the initial image facilitates improving an overall lighting effect of the initial image; the extracted local feature facilitates improving face local details in the initial image.

Exemplarily, after extracting the local feature information and the global feature information of the initial image, the local feature information and the global feature information of the initial image are input into the fusion layer of the convolutional neural network, to obtain the bilateral grid matrix of the initial image. In actual applications, the bilateral grid matrix is sampling two dimensions, i.e., a space domain and a range domain, of the image. In the bilateral grid matrix, an image transformation operator is provided in each grid; a principle thereof is: in a region adjacent to the space domain and the range domain, the luminance for similar input images should also be similar upon operator transformation. Therefore, the operation operator in each grid may be considered as an approximate curve of input/output, i.e., an affine model. The grid is used for transforming the color of the image; each grid has a different function, for example, it is used for making blue of the image to be bluer, so that the effect of the sky to be better; it is used for making the color of the grass to be greener. Exemplarily, the bilateral grid may include 16×16 grids; each grid may include 8 channels; a gray value of the image may be 0-255; each channel may exemplarily include 32 levels; for example, the range of the gray value of the grid in one channel is 0-31; the range of the gray value of the grid in another channel is 32-63. Considering that the color value ranges of the image may be more concentrated, for example, the chroma range of the face would not be evenly distributed in 0-255; the level range of each channel in this embodiment is defined again.

Exemplarily, when obtaining the bilateral grid matrix of the initial image, the maximum pooling result map and the minimum pooling result map of the initial image are referred to. The maximum pooling result map is used for indicating the maximum value in each sampling region; the minimum pooling result map is used for indicating the minimum value in each sampling region. The level range of the 8 channels in each grid in the bilateral grid matrix obtained according to the maximum pooling result map and the minimum pooling result map of the initial image may adaptively reflect the range domain range in the initial image, so as to improve the image lighting effect.

Exemplarily, the luminance component map of the initial image is input to the pooling layer of the convolutional neural network; maximum pooling and the minimum pooling are performed at the same time on the luminance component, to obtain the maximum pooling result map and the minimum pooling result map of the initial image.

In an embodiment, to reduce the computing data amount of the convolutional neural network, before inputting the initial image to the convolutional neural network, a Laplace pyramid algorithm can be first adopted to shrink the initial image. The shrunken image has a smaller data amount, so as to improve the image lighting processing speed.

S106, affine transformation is performed on the initial image according to the bilateral grid matrix to obtain the target image.

The target image is an image obtained after lighting the initial image according to the lighting operation type.

In a possible implementing mode, performing affine transformation on the initial image according to the bilateral grid matrix to obtain the target image includes:

S21, the luminance component map of the initial image is sliced according to the bilateral grid matrix, the maximum pooling result map, and the minimum pooling result map to obtain an affine transformation matrix.

Exemplarily, after obtaining a rated bilateral grid matrix of the initial image, the luminance component map of the initial image is used as a guide; space domain and range domain sampling are performed on pixels of the luminance component map; a position thereof in the grid is found; difference is performed on the bilateral grid, to obtain the affine transformation matrix; the affine transformation matrix includes 8 channels.

In an embodiment, nonlinear affine transformation may further be performed on the initial image; and a single channel map obtained by means of convolution is used as the guide.

S22, affine transformation is performed on the initial image according to the affine transformation matrix, to obtain the target image.

Exemplarily, after obtaining the affine transformation matrix, affine transformation is performed on the initial image according to the affine transformation matrix, to obtain the target image.

In another possible implementing mode, the depth and width of the convolutional neural network and the number of the convolutional layer are both less than the depth and width of the convolutional neural network and the number of the convolutional layer in the embodiment above. The size of the bilateral grid matrix of the initial image may exemplarily be 16×16, and the depth thereof is 4.

At this moment, inputting the initial image to the convolutional neural network may be:

inputting the luminance component map of the initial image to the convolutional neural network.

Only inputting the luminance component map of the initial image to the convolutional neural network improves the feature extraction speed of the convolutional neural network.

Accordingly, performing affine transformation on the initial image according to the bilateral grid matrix to obtain the target image includes:

S31, the luminance component map of the initial image is sliced according to the bilateral grid matrix, the maximum pooling result map, and the minimum pooling result map to obtain a residual matrix.

The residual matrix of the initial image is a single channel.

S32, the target image is obtained according to the residual matrix and the initial image.

In an embodiment, obtaining the target image according to the residual matrix and the initial image includes:

Values of pixel points at a same position of the residual matrix and the luminance component map of the initial image are added to obtain the target image.

In this implementing mode, the image lighting algorithm is simple, the computing amount is low, and real-time lighting on the image can be implemented at the same time when photographing the image, so as to facilitate the user to check the image lighting effect in real time by means of a display screen.

In an embodiment, if before inputting the initial image to the convolutional neural network, the Laplace pyramid algorithm is first adopted to shrink the initial image. Accordingly, the obtained target image is a lighted image after shrinking; the image lighting method provided by the embodiments of the present disclosure should further include:

using the Laplace pyramid algorithm to amplify the target image, to obtain the lighted image having the same size as the initial image.

The image lighting method provided by the embodiments of the present disclosure includes: determining a convolutional neural network corresponding to a lighting operation type of an initial image; obtaining local feature information and global feature information of the initial image by means of the convolutional neural network; obtaining fusion feature information of the initial image based on the local feature information and the global feature information by means of the convolutional neural network; obtaining a maximum pooling result map and a minimum pooling result map by means of the convolutional neural network based on a luminance component map of the initial image; obtaining a bilateral grid matrix of the initial image based on the fusion feature information, the maximum pooling result map, and the minimum pooling result map; and performing affine transformation on the initial image according to the bilateral grid matrix to obtain a target image, the target image being an image obtained after lighting the initial image according to the lighting operation type. Regarding the image lighting method provided by this embodiment, by using the deep learnt convolutional neural network technology, using the convolutional neural network to perform feature extraction on the initial image, obtaining an adaptive bilateral grid matrix of the initial image based on the maximum pooling result map and the minimum pooling result map of the initial image, and obtaining a target image of the initial image according to the bilateral grid matrix, a lighting effect of the image is more natural.

Figure 4:
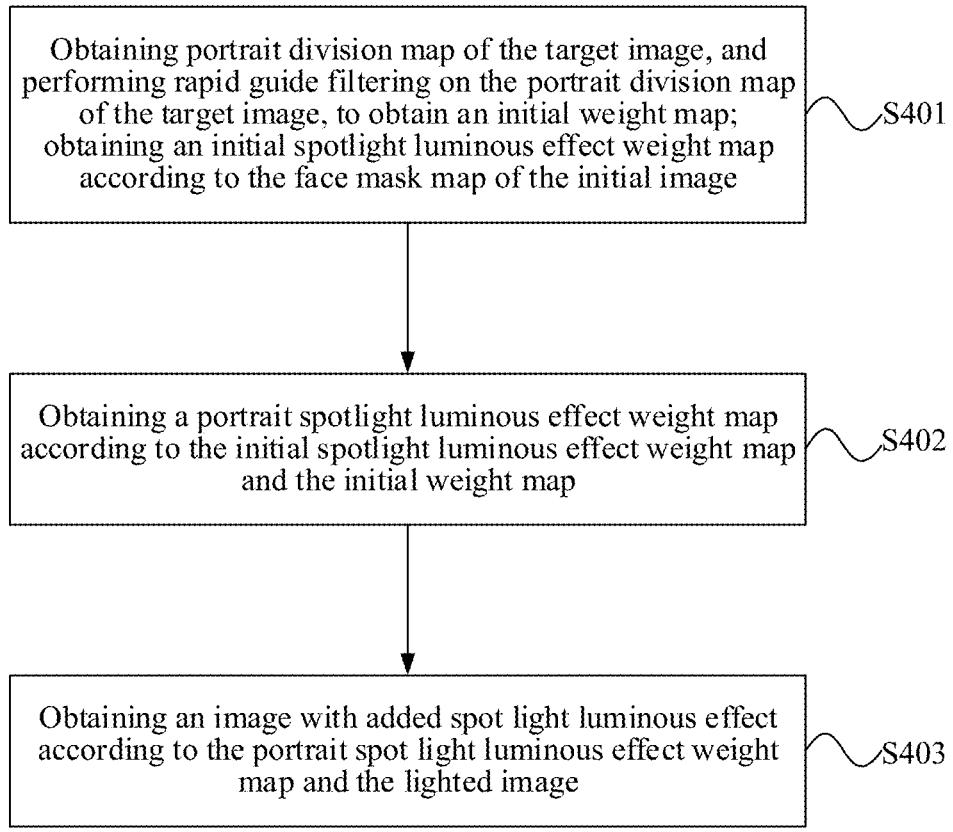
FIG. 4 is an exemplary flowchart II of the image lighting method provided by embodiments of the present disclosure.

Based on the embodiments above, the embodiments of the present disclosure further provide an image lighting method. FIG. 4 is an exemplary flowchart II of the image lighting method provided by embodiments of the present disclosure. This embodiment provides an image lighting method for adding a spotlight luminous effect for an initial image (i.e., a stage light in a luminous effect map shown in FIG. 2). As shown in FIG. 4, in the image lighting method provided by this embodiment, for the target image obtained after executing S101 to S106 in the embodiments shown in FIG. 1 on the initial image, the image lighting method further includes:

S401, a portrait division map of the target image is obtained, and rapid guide filtering is performed on the portrait division map of the target image, to obtain an initial weight map; an initial spotlight luminous effect weight map is obtained according to the face mask map of the initial image.

Exemplarily, the lighting operation type includes rimming light, photographic studio light, stage light, monochromatic light, two-color light, or polychromatic light.

Another aspect of the embodiments of the present disclosure can further provide an image lighting method. For any portrait map, the image lighting method shown in FIG. 4 is executed, so as to obtain a lighted map with the added spotlight luminous effect.

Exemplarily, after obtaining the target image of the initial image, portrait division is performed on the lighted image to obtain the portrait division map. Exemplarily, the image lighted using the dimming light or photographic studio light can be adopted. The portrait details in the target image are richer, and features are more obvious; as compared to the original initial image, portrait division can be executed more easily.

In an embodiment, obtaining the portrait division map of the target image includes:

S41, portrait division is performed on the target image, to obtain a portrait foreground map.

Figure 5:
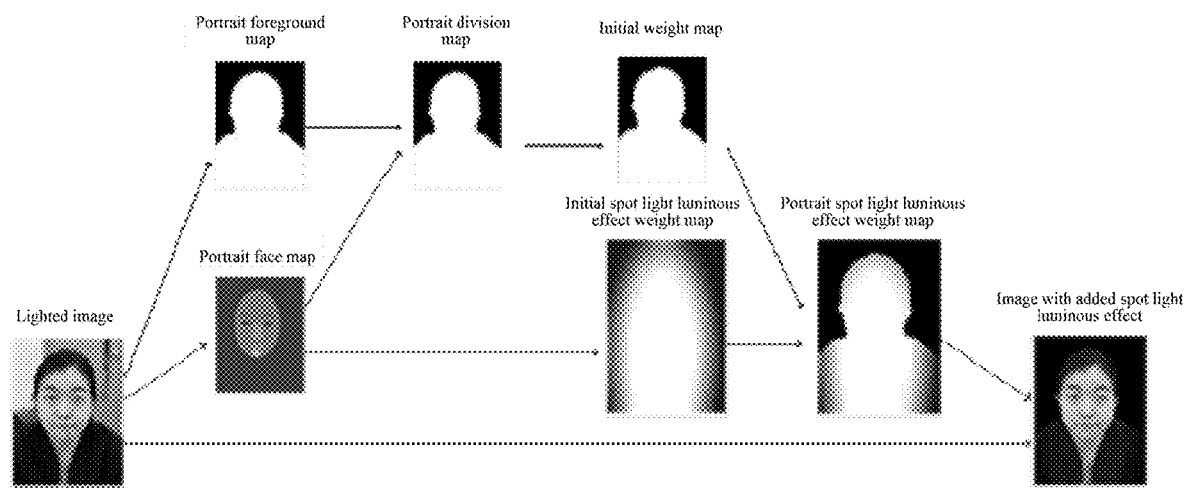
FIG. 5 is an exemplary flowchart of image processing in the image lighting method provided by embodiments of the present disclosure.

Exemplarily, FIG. 5 is an exemplary flowchart of image processing in the image lighting method provided by embodiments of the present disclosure. As shown in FIG. 5, for the lighted image S, a portrait division technology is used to obtain the portrait foreground map $S_w$ of the lighted image S; a value of a part in the portrait foreground map $S_w$ belonging to a human body is a first numeral value; and a value of a part, which does not belong to the human body, for example, belonging to the background, is a second numeral value. In actual applications, the first numeral value may be 1, and the second numeral value may be 0.

In an embodiment, the portrait foreground map can further be obtained based on depth information of the target image or the initial image. In actual applications, the portrait foreground map can further be obtained using a portrait division algorithm based on the depth information of the target image or the initial image.

S42, key point extraction is performed on the target image, to obtain a portrait face map.

Exemplarily, considering the problem that face division may be inaccurate in the existing portrait division technology, the key point extraction technology is adopted to obtain the portrait face map of the target image S. In an embodiment, the portrait face map may be a face mask map $S_f$ in the embodiment shown in FIG. 1. A value of a part in the face mask map $S_f$ belonging to the face is a third numeral value, and a value of a part that does not belong to the face is a fourth numeral value. In actual applications, the third numeral value may be 1, and the fourth numeral value may be 0.

In an embodiment, S41 and S42 may be executed at the same time and may also be executed in sequence, which do not have any strict time sequence relation.

S43, a portrait division map is obtained according to the portrait foreground map and the portrait face map.

Exemplarily, after obtaining the portrait foreground map $S_w$ and the portrait face map $S_f$, the portrait division map is obtained according to the portrait foreground map $S_w$ and the portrait face map $S_f$.

Exemplarily, considering that the face range in the portrait foreground map $S_w$ is not accurate enough and the portrait face map $S_f$ lacks information of other parts of the human body, the portrait foreground map $S_w$ and the portrait face map $S_f$ can be combined to obtain an accurate portrait division map.

In an embodiment, the process of obtaining the portrait division map includes:

traversing all pixel points in the portrait foreground map $S_w$, for any pixel point $S_w(i, j)$ in the portrait foreground map $S_w$, if a pixel point $S_f(i, j)$ at a same position in the portrait face map $S_f$ belongs to a part of a portrait, determining values of the pixel point $S_w(i, j)$ and the pixel point $S_f(i, j)$ are all 1, and if not, amend the value of the pixel point $S_w(i, j)$ in the portrait foreground map $S_w$ to 0; and obtaining the portrait division map;

where a value range of i is [0, N−1], a value range of j is [0, M−1], values of M and N are integers greater than 1, N is a total row number of the target image, and M is a total column number of the target image.

Exemplarily, the pixel point with the value of 1 in the portrait division map belongs to the human body; the pixel point with the value of 0 belongs to the background region.

Exemplarily, when adding the spotlight luminous effect to the initial image, a strong light is applied to the human body part, and luminance for the background part is lowered. Meanwhile, luminous effects with different strength may be respectively added to the face part according to a highlight region and a shadow region of the face.

In actual applications, a spotlight luminous effect weight map W1 can be obtained according to the face mask map of the initial image. Exemplarily, the value range of the value of each pixel point in the spotlight luminous effect weight map W1 is [0, 1]; the value of each pixel point represents the lighting strength for the pixel point at the same position in the initial image. Exemplarily, the spotlight luminous effect weight map W1 is generally a solid elliptic map upon Gaussian Blur.

In an embodiment, after obtaining the portrait division map of the target image, the target image is adopted as a guide; rapid guide filtering is performed on the portrait division map to obtain an initial weight map W2; an edge of the initial weight map W2 is more fitted to the edge of the portrait in the target image.

S402, a portrait spotlight luminous effect weight map W according to the initial spotlight luminous effect weight map W1 and the initial weight map W2.

Exemplarily, the values of the pixel points at the same position in the initial spotlight luminous effect weight map W1 and the initial weight map W2 can be multiplied, to obtain the value of each pixel point in the portrait spotlight luminous effect weight map.

S403, an image with added spotlight luminous effect is obtained according to the portrait spotlight luminous effect weight map and the target image.

Exemplarily, the target image is lighted according to the portrait spotlight luminous effect weight map, so that the target image is added with the spotlight luminous effect, thereby obtaining an image with added spotlight luminous effect.

In an embodiment, the process of adding the spotlight luminous effect includes:

obtaining an image $I_{out}$ with added spotlight luminous effect according to the portrait spotlight luminous effect weight map W and the target image $I_{in}$ using the following formula I:

$$I_{out}[i,j,1] = I_{in}[i,j,1] \times W[i,j];$$

$$I_{out}[i,j,2] = (I_{in}[i,j,2]-0.5) \times \min(1, W[i,j] \times 1.5) + 0.5;$$

$$I_{out}[i,j,3] = (I_{in}[i,j,3]-0.5) \times \min(1, W[i,j] \times 1.5) + 0.5; \quad (I)$$

where a value range of i is [0, N−1], a value range of j is [0, M−1], values of M and N are integers greater than 1, N is a total row number of the target image, and M is a total column number of the target image.

Exemplarily, the target image $I_{in}$ generally includes three component images, which may be respectively represented as [:, :, 1], [:, :, 2], and [:, :, 3]; for example, when an image format is an RGB format, the component images [:, :, 1], [:, :, 2], and [:, :, 3] of the image $I_{in}$ may be respectively represented as a red component image, a green component image, and a blue component image of the image $I_{in}$. In an embodiment, the format of the image $I_{in}$ may also be YcbCr.

The image lighting method provided by the embodiments of the present disclosure includes: obtaining the portrait division map of the target image; obtaining an initial spotlight luminous effect weight map according to the face mask map of the initial image; obtaining a portrait spotlight luminous effect weight map according to the initial spotlight luminous effect weight map and the portrait division map; and obtaining an image with added spotlight luminous effect according to the portrait spotlight luminous effect weight map and the target image. By obtaining the portrait spotlight luminous effect weight map, lighting the target image according to the portrait spotlight luminous effect weight map to obtain the image with added spotlight luminous effect can improve the lighting effect of the spotlight luminous effect.

The embodiments of the present disclosure further provide an image lighting apparatus, configured to execute the image lighting method in embodiments in FIGS. 1 to 5. The same or similar technical features and technical effects are included.

Figure 6:
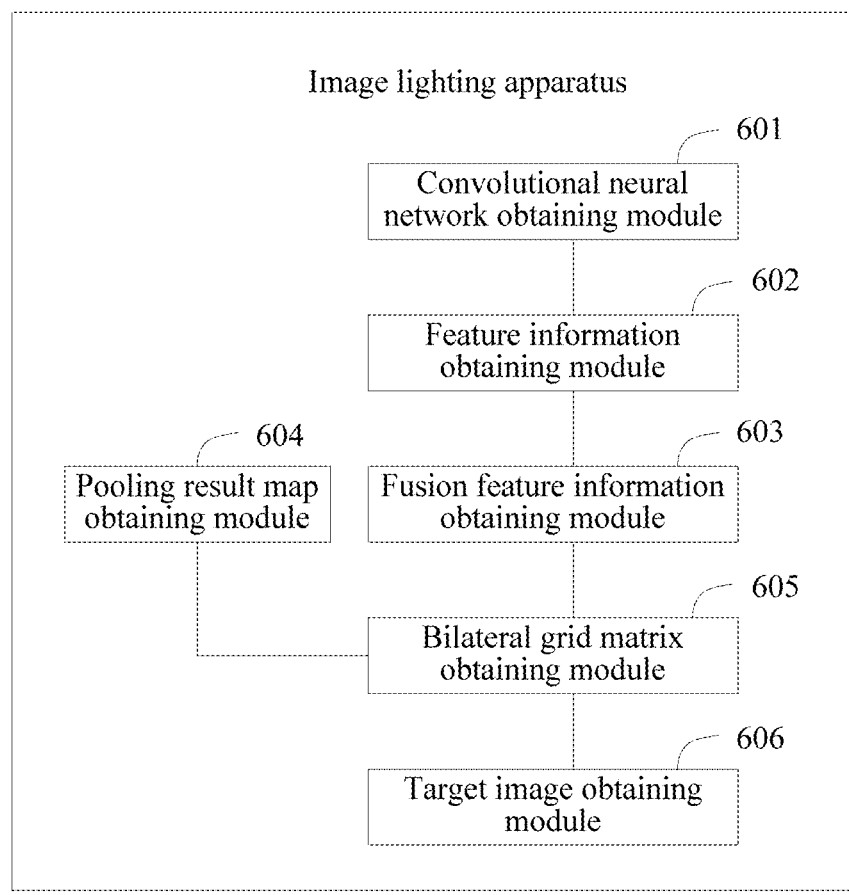
FIG. 6 is a schematic structural diagram of an image lighting apparatus provided by embodiments of the present disclosure.

FIG. 6 is a schematic structural diagram of an image lighting apparatus provided by embodiments of the present disclosure. As shown in FIG. 6, the image lighting apparatus includes:

a convolutional neural network obtaining module 601, configured to determine a convolutional neural network corresponding to a lighting operation type of an initial image;

a feature information obtaining module 602, configured to obtain local feature information and global feature information of the initial image by means of the convolutional neural network;

a fusion feature information obtaining module 603, configured to obtain fusion feature information of the initial image by means of the convolutional neural network based on the local feature information and the global feature information;

a pooling result map obtaining module 604, configured to obtain a maximum pooling result map and a minimum pooling result map by means of the convolutional neural network based on a luminance component map of the initial image;

a bilateral grid matrix obtaining module 605, configured to obtain a bilateral grid matrix of the initial image based on the fusion feature information, the maximum pooling result map, and the minimum pooling result map; and a target image obtaining module 606, configured to perform affine transformation on the initial image according to the bilateral grid matrix to obtain a target image, the target image being an image obtained after lighting the initial image according to the lighting operation type.

In an embodiment, the target image obtaining module 606 is further configured to:

slice the luminance component map of the initial image according to the bilateral grid matrix, the maximum pooling result map, and the minimum pooling result map to obtain an affine transformation matrix; and perform affine transformation on the initial image according to the affine transformation matrix, to obtain the target image.

In an embodiment, the feature information obtaining module 602 is further configured to:

input the initial image and a face mask map of the initial image to the convolutional neural network, to obtain the local feature information and the global feature information of the initial image.

Figure 7:
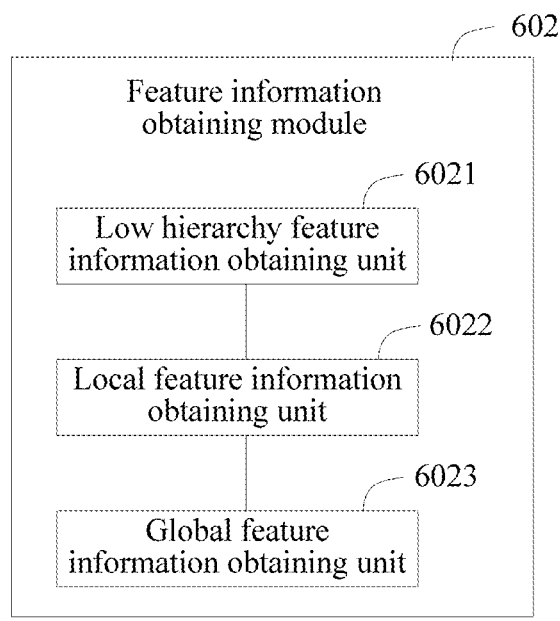
FIG. 7 is a schematic structural diagram II of the image lighting apparatus provided by embodiments of the present disclosure.

Exemplarily, based on the embodiment shown in FIG. 6, the embodiments of the present disclosure further provide an image lighting apparatus. FIG. 7 is a schematic structural diagram of an image lighting apparatus provided by embodiments of the present disclosure. As shown in FIG. 7, the feature information obtaining module 602 in the image lighting apparatus includes:

a low hierarchy feature information obtaining unit 6021, configured to input the initial image to a low hierarchy feature extraction layer of the convolutional neural network, to obtain low hierarchy feature information of the initial image;

a local feature information obtaining unit 6022, configured to input the low hierarchy feature information of the initial image to a local feature extraction layer of the convolutional neural network, to obtain local feature information of the initial image; and a global feature information obtaining unit 6023, configured to input the low hierarchy feature information of the initial image to a global feature extraction layer of the convolutional neural network, to obtain global feature information of the initial image.

Figure 8:
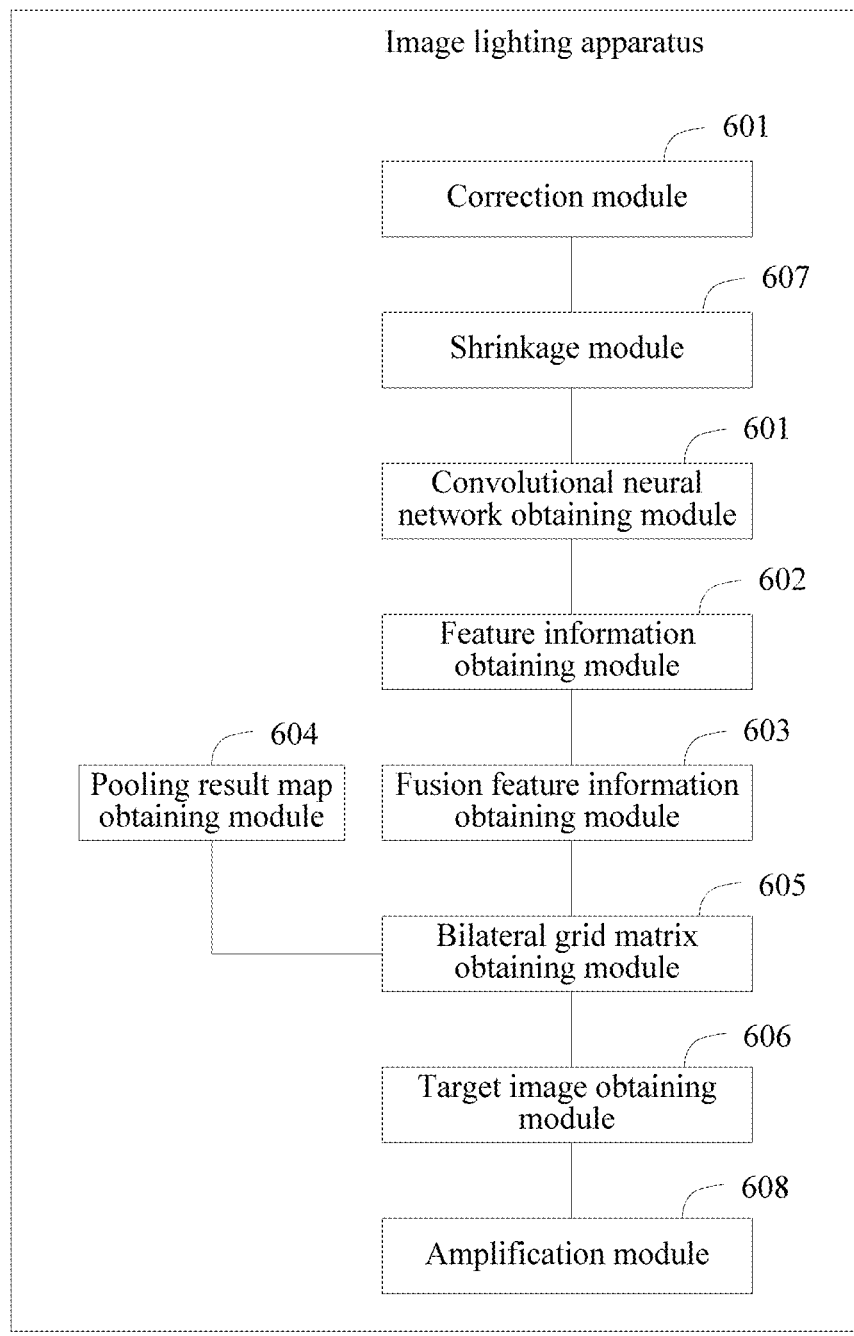
FIG. 8 is a schematic structural diagram III of the image lighting apparatus provided by embodiments of the present disclosure.

Exemplarily, based on the embodiment shown in FIG. 6 or 7, the embodiments of the present disclosure further provide an image lighting apparatus. FIG. 8 is a schematic structural diagram of an image lighting apparatus provided by embodiments of the present disclosure. As shown in FIG. 8, the image lighting apparatus further includes:

a correction module 600, configured to perform face correction on the luminance component map of the initial image according to the face mask map of the initial image, to obtain a corrected image; and the feature information obtaining module 602, further configured to obtain local feature information and global feature information of the initial image by means of the convolutional neural network based on the corrected image.

In an embodiment, as shown in FIG. 8, the image lighting apparatus further includes:

a shrinkage module 607, configured to shrink the initial image.

In an embodiment, as shown in FIG. 8, the image lighting apparatus further includes:

an amplification module 608, configured to amplify the target image, to obtain a target image having the same size as the initial image.

Figure 9:
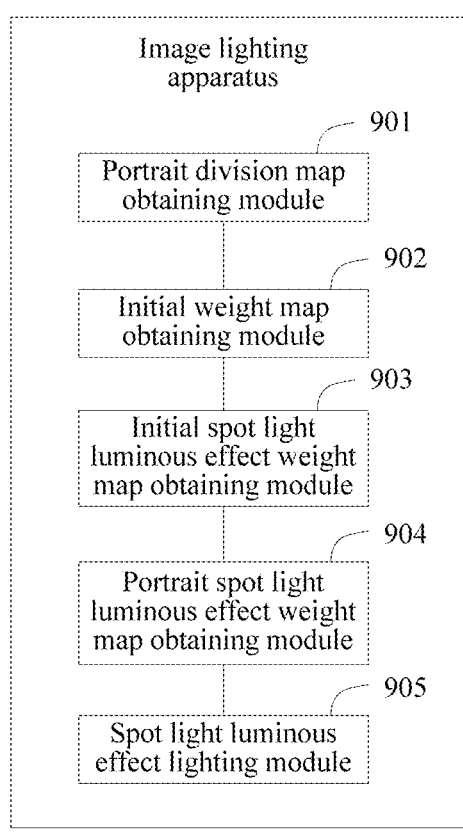
FIG. 9 is a schematic structural diagram IV of the image lighting apparatus provided by embodiments of the present disclosure.

Exemplarily, based on any embodiment shown in FIGS. 6-8, the embodiments of the present disclosure further provide an image lighting apparatus. FIG. 9 is a schematic structural diagram of an image lighting apparatus provided by embodiments of the present disclosure. As shown in FIG. 9, the image lighting apparatus further includes:

a portrait division map obtaining module 901, configured to obtain a portrait division map of the target image;

an initial weight map obtaining module 902, configured to perform rapid guide filtering on the portrait division graph map according to the target image, to obtain an initial weight map;

an initial spotlight luminous effect weight map obtaining module 903, configured to obtain an initial spotlight luminous effect weight map according to the face mask map of the initial image;

a portrait spotlight luminous effect weight map obtaining module 904, configured to obtain a portrait spotlight luminous effect weight map according to the initial spotlight luminous effect weight map and the initial weight map; and a spotlight luminous effect lighting module 905, configured to obtain an image with added spotlight luminous effect according to the portrait spotlight luminous effect weight map and the target image.

In an embodiment, the spotlight luminous effect lighting module 905 is further configured to:

obtaining an image $I_{out}$ with added spotlight luminous effect according to the portrait spotlight luminous effect weight map W and the target image $I_{in}$ using the following formula:

$$I_{out}[i,j,1]=I_{in}[i,j,1]\times W[i,j];$$

$$I_{out}[i,j,2]=(I_{in}[i,j,2]-0.5)\times\min(1,W[i,j]\times 1.5)+0.5;$$

$$I_{out}[i,j,3]=(I_{in}[i,j,3]-0.5)\times\min(1,W[i,j]\times 1.5)+0.5;$$

where a value range of i is [0, N−1], a value range of j is [0, M−1], values of M and N are integers greater than 1, N is a total row number of the target image, and M is a total column number of the target image.

Figure 10:
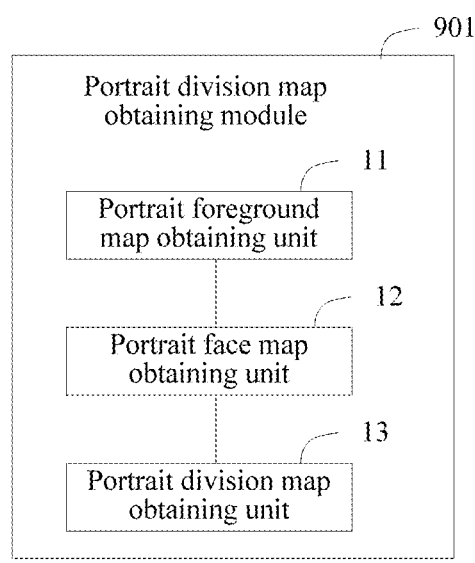
FIG. 10 is a schematic structural diagram V of the image lighting apparatus provided by embodiments of the present disclosure.

Exemplarily, based on the embodiment shown in FIG. 9, the embodiments of the present disclosure further provide an image lighting apparatus. FIG. 10 is a schematic structural diagram of an image lighting apparatus provided by embodiments of the present disclosure. As shown in FIG. 10, the portrait division map obtaining module 901 in the image lighting apparatus includes:

a portrait foreground map obtaining unit 11, configured to perform portrait division on the target image, to obtain a portrait foreground map;

a portrait face map obtaining unit 12, configured to perform key point extraction on the target image, to obtain a portrait face map; and a portrait division map obtaining unit 13, configured to obtain a portrait division map according to the portrait foreground map and the portrait face map.

In an embodiment, the portrait division map obtaining module 13 is further configured to:

traverse all pixel points in the portrait foreground map $S_w$, for any pixel point $S_w$ in the portrait foreground map $S_w(i, j)$, if a pixel point $S_f$ at a same position in the portrait face map $S_f(i, j)$ belongs to a part of a portrait, determine values of the pixel point $S_w(i, j)$ and the pixel point $S_f(i, j)$ are all 1, and if not, amend the value of the pixel point $S_w$ in the portrait foreground map $S_w(i, j)$ to 0; and obtain the portrait division map;

where a value range of i is [0, N−1], a value range of j is [0, M−1], values of M and N are integers greater than 1, N is a total row number of the target image, and M is a total column number of the target image.

In an embodiment, the face mask map further includes at least one of nose shadow information, nose wing information, nose tip information, cheek information, temple information, or skin color type information of a face.

In an embodiment, the lighting operation type includes rimming light, photographic studio light, stage light, monochromatic light, two-color light, or polychromatic light.

In an embodiment, the target image obtaining module 606 is further configured to:

slice the luminance component map of the initial image according to the bilateral grid matrix, the maximum pooling result map, and the minimum pooling result map to obtain a residual matrix;

obtain the target image according to the residual matrix and the initial image.

In an embodiment, the target image obtaining module 606 is further configured to:

add values of pixel points at a same position of the residual matrix and the luminance component map of the initial image to obtain the target image.

Figure 11:
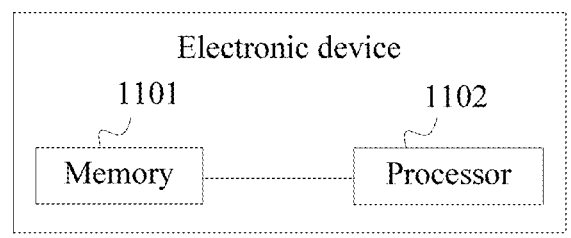
FIG. 11 is a schematic structural diagram of an electronic device provided by embodiment of the present disclosure.

Another aspect of the embodiments of the present disclosure further provides an electronic device. FIG. 11 is a schematic structural diagram of an electronic device provided by embodiment of the present disclosure. As shown in FIG. 11, the electronic device includes:

a memory 1101, configured to store a program instruction; and a processor 1102, configured to invoke and execute the program instruction in the memory to execute the method in the embodiments shown in FIGS. 1-5.

Another aspect of the embodiments of the present disclosure further provides a readable storage medium. Computer programs are stored in the readable storage medium. The computer programs are used for executing the method operations in the embodiments shown in FIGS. 1-5.

The apparatus in this embodiment and the method in the preceding embodiments are two aspects in the same inventive concept; the method implementing process is described in details previously, and therefore, persons of ordinary skill in the art can clearly understand the structure and implementing process of the system in this embodiment according to the preceding description; in order to simplify the description, details are not described below again.

It should be understood that the disclosed system, apparatus, and method in the embodiments provided in the present disclosure may be implemented by other modes. For example, the apparatus embodiments described above are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by means of some interfaces. The indirect couplings or communication connections between the apparatuses or units may be implemented in electronic, mechanical, or other forms.

Terms "first", "second", "third", and "fourth" in the description, claims, and the drawings in the present disclosure are used for distinguishing similar objects, rather than describing specific sequences or orders. It should understood that data used in this way may be exchanged in a proper condition, so that the embodiments described herein can be implemented in sequences except to the content illustrated or described herein. In addition, terms "include" and "have" and any deformation thereof aim at covering non-exclusive "comprising", for example, the process, method, system, product, or device comprising a series of operations or units is not limited to the operations or units clearly listed, but can include other operations or units that are not clearly listed or inherent to the process, method, product, or device.

Persons of ordinary skill in the art can understand that: implementing all or some of the operations of the method embodiments may be completed by means of hardware related to the program instructions. The preceding program may be stored in a computer readable storage medium. During execution, the program executes the operations of the method embodiments; moreover, the preceding storage medium includes media that can store program codes, such as ROM, RAM, disk, or optical disc.

It should be explained at last that: the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, and such modifications or replacements do not departing the essence of the corresponding technical solutions from the scope of the technical solutions of the embodiments of the present disclosure.

The invention claimed is:

1. An image lighting method, comprising:
   determining a convolutional neural network corresponding to a lighting operation type of an initial image;
   obtaining local feature information and global feature information of the initial image by means of the convolutional neural network;
   obtaining, based on the local feature information and the global feature information, fusion feature information of the initial image by means of the convolutional neural network;
   obtaining, based on a luminance component map of the initial image, a maximum pooling result map and a minimum pooling result map by means of the convolutional neural network;
   obtaining, based on the fusion feature information, the maximum pooling result map, and the minimum pooling result map, a bilateral grid matrix of the initial image; and
   performing affine transformation on the initial image according to the bilateral grid matrix to obtain a target image, the target image being an image obtained after lighting the initial image according to the lighting operation type.

2. The method according to claim 1, wherein the performing affine transformation on the initial image according to the bilateral grid matrix to obtain a target image comprises:
   slicing the luminance component map of the initial image according to the bilateral grid matrix, the maximum pooling result map, and the minimum pooling result map to obtain an affine transformation matrix; and
   performing affine transformation on the initial image according to the affine transformation matrix to obtain the target image.

3. The method according to claim 1, wherein the performing affine transformation on the initial image according to the bilateral grid matrix to obtain a target image comprises:
   slicing the luminance component map of the initial image according to the bilateral grid matrix, the maximum pooling result map, and the minimum pooling result map to obtain a residual matrix; and
   obtaining the target image according to the residual matrix and the initial image.

4. The method according to claim 3, wherein the obtaining the target image according to the residual matrix and the initial image comprises:
   adding values of pixel points at a same position of the residual matrix and the luminance component map of the initial image to obtain the target image.

5. The method according to claim 1, wherein the obtaining local feature information and global feature information of the initial image by means of the convolutional neural network comprises:
   inputting the initial image and a face mask map of the initial image to the convolutional neural network; and
   obtaining the local feature information and the global feature information of the initial image.

6. The method according to claim 5, wherein the face mask map further comprises at least one of nose shadow information of a face, nose wing information of the face, nose tip information of the face, cheek information of the face, temple information of the face, or skin color type information of the face.

7. The method according to claim 1, wherein the obtaining local feature information and global feature information of the initial image by means of the convolutional neural network comprises:
   inputting the initial image to a low hierarchy feature extraction layer of the convolutional neural network;
   obtaining low hierarchy feature information of the initial image;
   inputting the low hierarchy feature information of the initial image to a local feature extraction layer of the convolutional neural network;
   obtaining the local feature information of the initial image;
   inputting the low hierarchy feature information of the initial image to a global feature extraction layer of the convolutional neural network; and
   obtaining the global feature information of the initial image.

8. The method according to claim 1, wherein before the obtaining local feature information and global feature information of the initial image by means of the convolutional neural network, the method further comprises:
   performing face correction on the luminance component map of the initial image according to the face mask map of the initial image;
   obtaining a corrected image; and
   the obtaining local feature information and global feature information of the initial image by means of the convolutional neural network comprises:
   obtaining, based on the corrected image, the local feature information and the global feature information of the initial image by means of the convolutional neural network.

9. The method according to claim 1, wherein before the obtaining local feature information and global feature information of the initial image by means of the convolutional neural network, the method further comprises:
    shrinking the initial image.
10. The method according to claim 9, wherein after the performing affine transformation on the initial image according to the bilateral grid matrix to obtain a target image, the method further comprises:
    amplifying the target image; and
    obtaining a target image having the same size as the initial image.
11. The method according to claim 1, wherein after the performing affine transformation on the initial image according to the bilateral grid matrix to obtain a target image, the method further comprises:
    obtaining a portrait division map of the target image;
    performing rapid guide filtering on the portrait division map according to the target image;
    obtaining an initial weight map;
    obtaining an initial spotlight luminous effect weight map according to a face mask map of the initial image;
    obtaining a portrait spotlight luminous effect weight map according to the initial spotlight luminous effect weight map and the initial weight map; and
    obtaining an image with added spotlight luminous effect according to the portrait spotlight luminous effect weight map and the target image.
12. The method according to claim 11, wherein the obtaining an image with added spotlight luminous effect according to the portrait spotlight luminous effect weight map and the target image comprises:
    obtaining, by using the following formulas, the image $I_{out}$ with added spotlight luminous effect according to the portrait spotlight luminous effect weight map W and the target image $I_{in}$;

$$I_{out}[i,j,1]=I_{in}[i,j,1]\times W[i,j];$$

$$I_{out}[i,j,2]=(I_{in}[i,j,2]-0.5)\times \min(1,W[i,j]\times 1.5)+0.5;$$

$$I_{out}[i,j,3]=(I_{in}[i,j,3]-0.5)\times \min(1,W[i,j]\times 1.5)+0.5;$$

wherein a value range of i is [0, N−1], a value range of j is [0, M−1], values of M and N are integers greater than 1, N is a total row number of the target image, and M is a total column number of the target image.
13. The method according to claim 11, wherein the obtaining the portrait division map of the target image comprises:
    performing portrait division on the target image;
    obtaining a portrait foreground map;
    performing key point extraction on the target image;
    obtaining a portrait face map; and
    obtaining a portrait division map according to the portrait foreground map and the portrait face map.
14. The method according to claim 13, wherein the obtaining a portrait division map according to the portrait foreground map and the portrait face map comprises:
    traversing all pixel points in the portrait foreground map $S_w$;
    for any one pixel point $S_w(i, j)$ in the portrait foreground map $S_w$, if a pixel point $S_f(i, j)$ at a same position in the portrait face map $S_f$ belongs to a part of a portrait, determining whether values of the pixel point $S_w(i, j)$ and the pixel point $S_f(i, j)$ are all 1;
    if not all of the values of the pixel point $S_w(i, j)$ and the pixel point $S_f(i, j)$ are 1, amending the value of the pixel point $S_w(i, j)$ in the portrait foreground map $S_w$ to 0; and
    obtaining the portrait division map;
    wherein a value range of i is [0, N−1], a value range of j is [0, M−1], values of M and N are integers greater than 1, N is a total row number of the target image, and M is a total column number of the target image.
15. The method according to claim 1, wherein the lighting operation type comprises rimming light, photographic studio light, stage light, monochromatic light, two-color light, or polychromatic light.
16. An electronic device, comprising:
    a memory, configured to store computer-readable instructions; and
    a processor, configured to invoke and execute the computer-readable instructions in the memory to execute the following operations:
    determining a convolutional neural network corresponding to a lighting operation type of an initial image;
    obtaining local feature information and global feature information of the initial image by means of the convolutional neural network;
    obtaining, based on the local feature information and the global feature information, fusion feature information of the initial image by means of the convolutional neural network;
    obtaining, based on a luminance component map of the initial image, a maximum pooling result map and a minimum pooling result map by means of the convolutional neural network;
    obtaining, based on the fusion feature information, the maximum pooling result map, and the minimum pooling result map, a bilateral grid matrix of the initial image; and
    performing affine transformation on the initial image according to the bilateral grid matrix to obtain a target image, the target image being an image obtained after lighting the initial image according to the lighting operation type.
17. The electronic device according to claim 16, wherein the performing affine transformation on the initial image according to the bilateral grid matrix to obtain a target image comprises:
    slicing the luminance component map of the initial image according to the bilateral grid matrix, the maximum pooling result map, and the minimum pooling result map to obtain an affine transformation matrix; and
    performing affine transformation on the initial image according to the affine transformation matrix to obtain the target image.
18. The electronic device according to claim 16, wherein the performing affine transformation on the initial image according to the bilateral grid matrix to obtain a target image comprises:
    slicing the luminance component map of the initial image according to the bilateral grid matrix, the maximum pooling result map, and the minimum pooling result map to obtain a residual matrix; and
    obtaining the target image according to the residual matrix and the initial image.
19. The electronic device according to claim 18, wherein the obtaining the target image according to the residual matrix and the initial image comprises:
    adding values of pixel points at a same position of the residual matrix and the luminance component map of the initial image to obtain the target image.

20. A non-transitory storage medium, configured to store computer-readable instructions, wherein execution of the instructions by the processor causes the processor to perform the following operations:
- determining a convolutional neural network corresponding to a lighting operation type of an initial image;
- obtaining local feature information and global feature information of the initial image by means of the convolutional neural network;
- obtaining, based on the local feature information and the global feature information, fusion feature information of the initial image by means of the convolutional neural network;
- obtaining, based on a luminance component map of the initial image, a maximum pooling result map and a minimum pooling result map by means of the convolutional neural network;
- obtaining, based on the fusion feature information, the maximum pooling result map, and the minimum pooling result map, a bilateral grid matrix of the initial image; and
- performing affine transformation on the initial image according to the bilateral grid matrix to obtain a target image, the target image being an image obtained after lighting the initial image according to the lighting operation type.

* * * * *